3,531,939
WATER AND POWER SUPPLY METHOD
Glenn D. James, 1200 Encino Ave.,
Arcadia, Calif. 91006
Filed July 1, 1968, Ser. No. 741,661
Int. Cl. F16h 41/04
U.S. Cl. 60—55          5 Claims

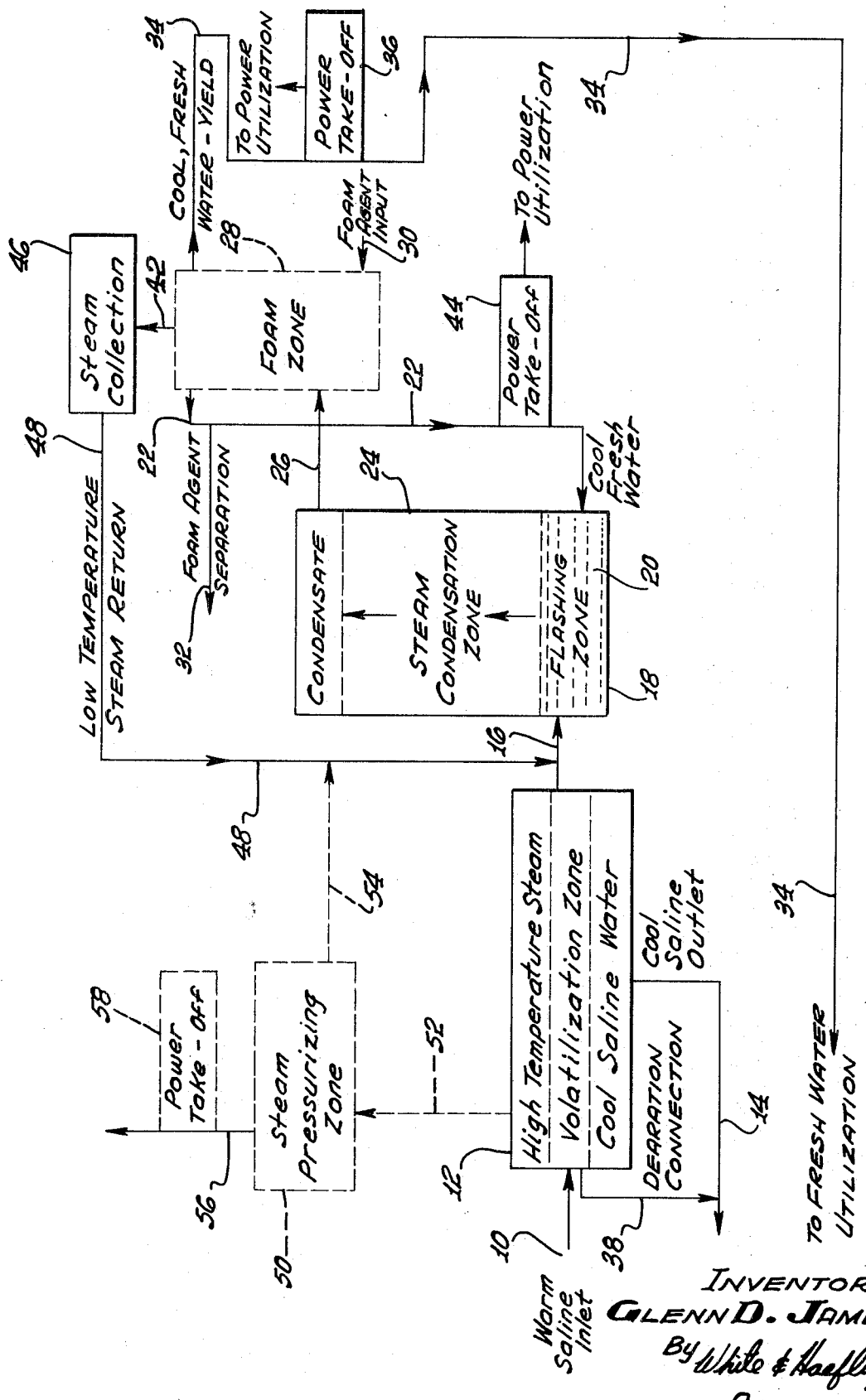

ABSTRACT OF THE DISCLOSURE

Steam is obtained from a naturally warm water body by introducing the body water to a reduced pressure zone. The steam is used to warm relatively colder water to generate additional water vapor or steam therefrom which is permitted to rise with expansion to cool sufficiently to return at least partially to the liquid state whereby the natural heat of an openly exposed water body is used to create water head.

BACKGROUND OF THE INVENTION

Field of the invention

This invention has to do with obtaining power. "Power" herein refers to an energy source available to do work in whatever form. Thus water head is power as is electricity generated by operation of turbines by water descending from a head. In many areas of the world saline water is plentiful but is not located well for power use.

The use of steam to obtain power has the disadvantage of requiring generation of steam from water which demands large inputs of heat. It is the purpose of this invention to convert water bodies to useful power whatever their elevation and essentially without special heat input.

Prior art

Various primarily desalinization schemes have proposed vaporizing water bodies to separate their saline content and condensing the vapor. In so doing, these schemes generally waste the heat of vaporization content of the steam, which I have recognized as a potential source of power. Prior workers sought only to condense the steam as rapidly as possible so as to get potable water. In my invention potable water is realized but primarily power is produced in the form of increased water head.

SUMMARY OF THE INVENTION

It is a major objective of the present invention to recover a large portion of the heat of vaporization of a unit of steam as it is condensed back to water in the form of water at an increased head or alternatively as compressed steam. To accomplish this objective the heat of vaporization is put into water which is flashed upwardly to give condensate at an elevation and water at an increased head, providing the system with power equal to the heat of vaporization, neglecting efficiency losses.

In particular, the invention provides a method of obtaining power through generation of water at a head in a water system in which steam is produced from realtively warm water bodies, which method includes absorbing steam into water at a first elevation, flashing the water to generate steam, expanding the generated steam to a larger volume at a higher elevation at a lower temperature, condensing a portion of the elevated steam to a water head at the higher elevation, returning a portion of the elevated steam to the lower elevation and heating the returned steam with additional steam from the water source and absorbing the combined steam into water at the first elevation. Water from the water body which may be saline is evaporated in a zone of reduced pressure to produce the steam, and fresh water if saline. The steam produced from the flash is preferably drawn from the higher elevation to the lower elevation by the steam produced from the water source. This effects a pressure reduction above the water to be flashed which facilitates that step of the method. Flashing is further facilitated by increasing the surface exposure of the water to be flashed, e.g. by introducing a foaming agent or hollow beads into the flashing zone.

The water to be vaporized to steam is desirably dearated. This may be accompilshed in an economical manner by absorbing air from this water into any cool water supply.

Specifically my method of obtaining power from the heat present in naturally warmed water bodies by converting the heat into water head useful for power generation may include withdrawing relatively warm water from a body thereof; dearating the water; vaporizing a portion of the water by subjecting the withdrawn water in a vaporizing zone to pressures not greater than the vapor pressure of the water to produce steam and cooler water; preferentially absorbing air in the cooler water to deaerate incoming warm water; pressurizing at least a portion of the steam to a higher pressure; accelerating the steam by restricting its volume in passing the steam outward from the vaporizing zone; passing the accelerated steam into relatively cool water to transfer heat from the steam to the water; flashing the increased heat content water in a vertically extending zone in which steam produced by flashing expands in ascending vertically thereby doing work and cooling; recovering a first portion of the steam at the top of the flashing zone as water, passing a portion of this water back to the bottom of the flashing zone to be recombined with fresh steam, passing a second portion of the recovered water to utilization for power generation from its head; drawing relatively cool steam from the top of the flashing zone into the relatively warm steam produced in the vaporizing zone, and passing the combined steam into relatively cool water returned from the top of the flashing zone for reflashing.

Apparatus is provided for carrying out the foregoing method, which apparatus comprises means for combining steam from a water source with relatively cool water, means for flashing the water thus combined, means for cooling the steam produced by flashing, means for separating water and steam from the flash product at a higher elevation, means for returning a portion of the flash produced steam to the flashing means, means for heating the returned steam and means for utilizing the flash produced water for power generation. The apparatus may further include means for jetting steam to the water combining means which jetting means may be connected to the flash produced steam separating means, to draw the separated steam into source derived steam. In addition, means for introducing surface exposing means into the water to be flashed may be provided.

BRIEF DESCRIPTION OF THE DRAWINGS

The single figure is a schematic view of the present apparatus.

DESCRIPTION OF THE PREFERRED EMBODIMENTS

Referring to the figure an apparatus for utilizing the heat of vaporization of steam to acquire increased water head is depicted.

Saline water at 10 which is at ambient temperature such as might be achieved in a sea, ocean or lake exposed to the sun e.g. 50°–85° F. is introduced into a volatilization zone 12. The zone 12 is a chamber having a reduced pressure not greater than the vapor pressure of the introduced water whereby the water boils giving off vapor or as used herein "steam." This steam rises to the top of zone 12 as indicated. The water which was boiled to yield the steam is now cooler and is returned through the bottom of zone 12 to the water body along line 14. Because cooler water in line 14 will preferentially absorb air e.g. from relatively warm water in zone 12, line 38 provides open communication between the zone 12 and water in line 14 to facilitate dearation of water in zone 12.

The steam obtained in zone 12 is passed along line 16 to the flashing zone 18. For purposes to appear it is highly desirable to constrict the volume of steam passing along line 16 to increase its velocity of flow. From line 16 the steam enters water 20 disposed in the flashing zone at a first elevation having entered this zone along line 22 as will be described. The water 20 is cool relative to the steam and the intermixing of the two heats the water while cooling the steam. The resultant increased temperature water flashes into vapor at the interface of the flashing zone 18 and steam condensation zone 24. In practice zones 18 and 24 are continuous. The steam produced by the flashing naturally rises to a second, higher elevation into the condensation zone which is preferably maintained at a reduced pressure by means to be described. In expanding and filling the zone the flash produced steam does work and loses heat proportionally to the work done. Thus at the top of the steam condensation zone the steam is at least partly liquid water.

The water and steam may be passed out of condensation zone 24 along line 26 to a foam zone 28 in which the water and steam is mixed with a foaming agent such as a surfactant or any material lowering the surface tension of the water to less than normal. The foaming agent may be introduced into foam zone 28 along line 30 and removed at 32 at the top of the foam zone. In one embodiment the foaming agent may take the form of hollow balls or spheres which will mix with the water and steam to increase the surface area thereof. Where a foaming agent is used surface exposure is greatly increased with consequent increased flashing as the water and steam move upward through foam zone 28.

At the top of the foam zone 28 or directly from the condensation zone 24, if the foam zone is omitted provision is made for removal of water—condensate—taken out as yield along line 34. It is this water, now at an increased head which represents the power of the heat of vaporization which was absorbed by the water introduced into the flashing zone 18.

Water in line 34 may be passed through a power take off 36 e.g. turbines to take out the power for generation of electricity.

A second portion of the water produced at the top of foam zone 28 is passed along line 22 to carry the foaming agent out of the foam zone into line 32. This portion of the water is returned to the flashing zone 18 where it is combined with steam for reabsorbtion of heat values from the steam. As shown a subsidiary power take off 44 e.g. turbines may be provided to take advantage of the head of water in line 22.

The steam emerging from the top of foam zone 28 is passed along line 42 to a steam collector 46 which may be a chamber maintained at a lowered pressure to remove steam from the foam zone 18 and to assist in flashing the water in the foam zone. The steam collector 46 communicates along line 48 with line 16 between the volatilization zone 12 and the flashing zone 18. As mentioned above the line 16 may be constricted to accelerate flow of steam to the flashing zone 18. In this manner a vacuum will be drawn on line 48 and thus through the flashing system. The steam returned along line 48 has done much work in flashing water in the flashing zone 18, expanding in condensation zone 24, again flashing water in foam zone 28 and is cool. The steam from volatilization zone 12 on the other hand is relatively warm. Mixture of the two steams produces a steam which is adequate for flashing water 20 in the flashing zone 12.

It will be apparent that the present invention provides a means for recovering the heat of vaporization of a quantity of steam as it is condensed to water, the recovery being in the form of a liquid head. Recycled steam is transported by incoming steam to a flashing zone where all the steam is absorbed on cold water to warm the water. The added steam thus contributes its heat of vaporization giving the overall system power equal to the heat of vaporization. The water with this heat content may be passed into a chamber for flashing to steam to do work emerging at a lower pressure for recycle. The cooled water after the flashing is fed back for reheating, the power of the heat of vaporization being removed by the work done by the expanding steam.

The condensation of the steam may be accomplished by driving cool water droplets upwardly through the steam to enable condensation of the steam thereon. The pressure of the steam may be varied by compression or decompression as desired for optimum feed condition.

The steam obtained in zone 12 may be pressurized prior to use in the remainder of the system. For this purpose a steam pressurizing zone 50 e.g. a compressor or other device for reducing steam volume and increasing pressure is provided. Steam is passed along line 52 from the volatilization zone 12 to the pressurizing zone 50. All the pressurized steam may be passed along line 54 to join low temperature steam in line 48 for carrying out the invention as above described. Alternatively, all or a portion of the higher pressure steam, but less than all of the steam generated in zone 12, may be passed along line 56 to a power take off 58, e.g. a steam driven turbine.

I claim:

1. In the method of obtaining power through generation of water at a head in a water system steam from relatively warm water bodies, absorbing said steam into water at a first elevation, flashing the water to generate steam, expanding the generated steam to a larger volume at a higher elevation at a lower temperature, condensing a portion of the elevated steam to a water head at said higher elevation, returning a portion of the elevated steam to said first elevation and heating said returned steam with additional steam from said water source and absorbing the combined steam into water at said first elevation.

2. Method according to claim 1 in which said water is saline and is evaporated in a zone of reduced pressure to produce said steam.

3. Method according to claim 1 in which said elevated steam is drawn into steam from said water source.

4. Method according to claim 1 in which said water is dearated prior to evaporation to steam.

5. Method of obtaining power from the heat present in naturally warmed water bodies by converting said heat to water head useful for power generation which includes withdrawing relatively warm water from a body thereof; dearating the water; vaporizing a portion of the water by subjecting the withdrawn water in a vaporizing zone to pressure not greater than the vapor pressure of the water to produce steam and cooler water; preferentially absorbing air in the cooler water to dearate incoming warm water; pressurizing at least a portion of the steam to a higher pressure; accelerating the steam by restricting its volume in passing the steam outward from the vaporizing zone; passing the accelerated steam into relatively cool water to transfer heat from the steam to the water; flashing the increased heat content water into a vertically extending zone, in which steam produced by flashing expands in ascending vertically thereby doing work and cooling; recovering a portion of the steam at the top of the flashing zone as water, passing a portion of this water back to the bottom of the flashing zone to be recombined with fresh steam, passing a second portion of the recovered water to utilization for power generation from its head; drawing relatively cool steam from the top of the flashing zone into the relatively warm steam produced in the vaporizing zone, and passing the combined steam into relatively cool water returned from the top of the flashing zone for reflashing.

References Cited

UNITED STATES PATENTS

| | | | |
|---|---|---|---|
| 3,438,869 | 4/1969 | Saavedra | 203—11 |
| 3,440,147 | 4/1969 | Rannenberg | 203—11 |
| 3,446,712 | 5/1969 | Othmer | 203—11 |

CARROLL B. DORITY, JR., Primary Examiner

U.S. Cl. X.R.

203—11

UNITED STATES PATENT OFFICE
CERTIFICATE OF CORRECTION

Patent No. 3,531,939         Dated October 6, 1970

Inventor(s) Glenn D. James

It is certified that error appears in the above-identified patent and that said Letters Patent are hereby corrected as shown below:

Column 4, line 44; after "system" insert --, generating--

SIGNED AND
SEALED
JAN 5 1971

(SEAL)
Attest:

Edward M. Fletcher, Jr.
Attesting Officer

WILLIAM E. SCHUYLER, JR.
Commissioner of Patents